United States Patent [19]

Blessinger

[11] 4,096,789
[45] Jun. 27, 1978

[54] SAW GUARD

[75] Inventor: James Edward Blessinger, Jasper, Ind.

[73] Assignee: Kimball International, Inc., Jasper, Ind.

[21] Appl. No.: 785,066

[22] Filed: Apr. 6, 1977

[51] Int. Cl.² ............................................. B27G 19/00
[52] U.S. Cl. ........................................ 83/478; 83/398; 83/545; 144/251 R
[58] Field of Search ................. 83/478, 398, 544, 545, 83/546; 144/251 R, 251 A

[56] References Cited

U.S. PATENT DOCUMENTS

| 2,868,569 | 1/1959 | Madden | 83/546 X |
| 2,913,926 | 11/1959 | Hammond | 83/478 X |
| 3,105,530 | 10/1963 | Peterson | 83/478 |
| 3,119,602 | 1/1964 | Johnson | 144/252 R X |
| 3,837,383 | 9/1974 | Ko | 144/251 A |

Primary Examiner—Willie G. Abercrombie
Attorney, Agent, or Firm—Albert L. Jeffers; John F. Hoffman

[57] ABSTRACT

A saw guard, especially for preventing splinters and the like for being thrown out from a saw, in which a flexible, strong, wear resistant material, such as belting, is cut into strips and the strips are connected to a housing which covers the saw from above so that a row of strips in side by side relation are in front of the saw while a row of strips arranged in parallel spaced aligned relation extend along at least one side of the saw. The strips along the side of the saw and being spaced apart permit free circulation of air through the sawing region to remove sawdust and the like therefrom but are effective in stopping splinters and the like from being thrown off from the saw because the arrangement of the strips are in parallel spaced relation.

7 Claims, 1 Drawing Figure

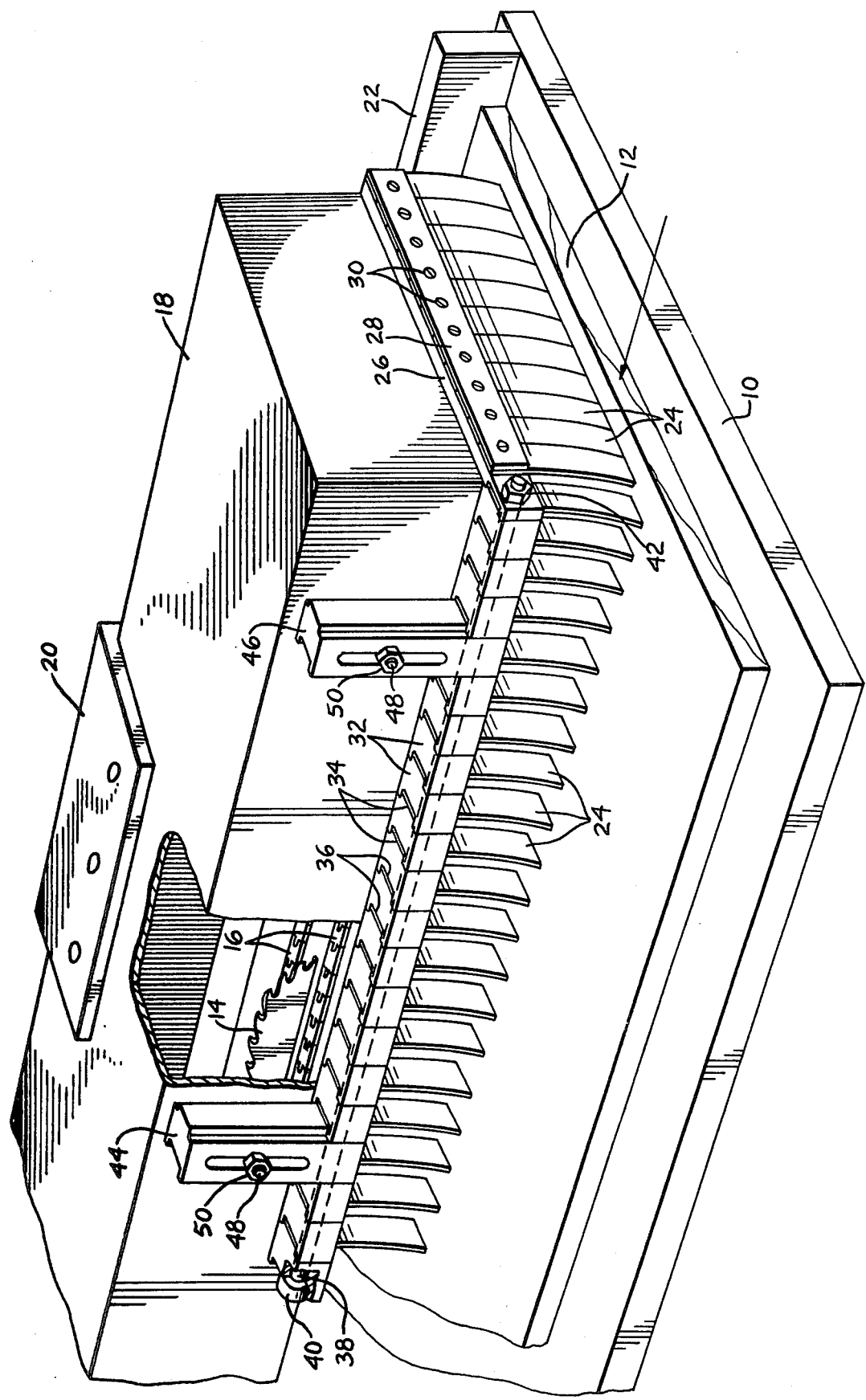

SAW GUARD

The sawing of material, especially wood material, is carried out on a large scale in connection with substantially any operation in which wood forms a working material.

It is, of course, absolutely essential that sawing operations of the nature referred to be carried out in the minimum length of time. This is dictated by economy but, as a practical matter, it has been found that the reduction of wood material to sawdust requires about the same expenditure of energy whether the sawing is accomplished rapidly or more slowly. The general tendency, thus, is to push wood work members through a sawing operation as rapidly as is consistent with getting a clean cut while avoiding stalling of the saw motor.

The increased speed of sawing, however, introduces the possibility that splinters and the like will fly off from the saw and create hazards for workers in the region of the saw.

The present invention has as a primary objective the provision of a saw guard which will permit a saw to be operated at full capacity while sawing wood while, at the same time, preventing splinters and the like from flying off from the sawing station and while, at the same time, maintaining the sawing station sufficiently open to permit free movement of air therethrough for conveying sawdust and the like away from the sawing region.

BRIEF SUMMARY OF THE INVENTION

According to the present invention, a sawing station which may consist of a saw blade extending through a table is provided with wood work members being advanced across the table into operative engagement with the saw which is driven in rotation.

The sawing station comprises a downwardly opening guard frame above the saw and spaced upwardly from the table to permit ready movement of work members over the table and into engagement with the saw.

According to the present invention, there is connected to the downwardly opening frame or housing flexible shielding in the form of strips of tough, wear resistant material, such as strips of power transmission belting, which extend from the bottom of the frame or housing downwardly to or near the table. The flexibility of the strips permits wood work members to move freely over the table into the sawing station while the strong, tough belting material will stop any splinters thrown off from the saw, even if of substantial size and weight.

The strips forming the shields in front of the saw are arranged in side by side relation while the strips forming the shield along the side of the saw are in aligned parallel spaced relation. The last mentioned shielding strips can be arranged along one or both sides of the saw as may be necessary, although in the normal course of events, shielding along one side of the saw is adequate because the housing can extend down the other side of the saw.

Support means are provided for supporting the strips making up the shielding about the saw, and it has been found that such shielding, when the strips are in the form of material referred to, namely, strips of power transmission belting or the like, are highly efficient for stopping splinters and the like which might be thrown off from the sawing station.

In general, the material employed for the shielding strips would consist either of textile reinforced elastomeric or rubber-like material or it could, presumably, consist of suitably strong, flexible plastic material. The strips must have sufficient weight not to be deflected by high velocity splinters and power transmission belting suggests itself because this material is inherently heavy, tough and strong while still possessing a degree of flexibility sufficient for purposes of the present invention.

The exact nature of the present invention will become more clearly apparent upon reference to the following detailed specification taken in connection with the accompanying drawing which is a perspective view of the saw guard according to the present invention.

DETAILED DESCRIPTION OF THE INVENTION

In the drawing, reference numeral 10 designates a table on which workpieces 12 are placed for being advanced through a sawing station which includes a rotary saw 14. The sawing table may be provided with belts 16 for conveying the workpiece through the sawing station if so desired.

The sawing station is enclosed from above by a guard housing 18 which opens downwardly and which may be supported as by bracket means 20 which extends downwardly and is connected to table 10 or to a support frame which supports table 10 if it is desired for the latter to be movable independently.

The housing 18 has a lower edge spaced upwardly from the table to permit work members 12 to be advanced along the table and through the sawing station. It might be mentioned that during the movement of the work members over the table, the work members can be guided by a fence member 22 adjustably connected to table 10.

The shield or splinter guard means according to the present invention comprises a plurality of like strips 24 of tough, flexible and relatively heavy material which, as mentioned, may conveniently be formed of commercial power transmission belting or the like. The strips 24, at their lower ends, are immediately adjacent or only slightly spaced upwardly from the upper surface of table 10 so that there is no gap between the lower ends of the strips and the surface of the work member 12 being sawed.

The strips 24 at the forward end of the housing 18 will be seen to be arranged in side by side relation. The upper ends of the strips, at the front end of the housing, are clamped between a rail 26 on the front end of the housing at the lower edge and a clamp strip 28 with screws 30 extending through the clamp strip and the upper ends of the guard strips 24 and into rail 26.

Along the side of housing 18, the strips 24 are arranged in aligned parallel, longitudinally spaced relation. For holding the strips in the position described and illustrated in the drawings, there is provided a plurality of block elements 32 each having a tongue 34 on one side and a groove 36 on the other side with the upper ends of the strips 24 positioned in the grooves and clamped in place therein by the aforementioned tongues. A stack of blocks of the length necessary to shield the saw from the side are arranged in stacked relation and a through bolt 38 extends therethrough which bolt has a head 40 on one end and a nut 42 on the other end.

A pair of spaced ones of the blocks, as indicated at 44 and 46, extend upwardly and are adapted for receiving studs 48 on the housing on which are mounted clamp nuts 50. Blocks 44 and 46 and the studs and clamp nuts provide means for holding the shield arrangement in vertical adjustability on the side of the housing at any desired level and which, in most cases, will be at the same level as the guard at the front of the housing.

The guard at the front of the housing may be adjustable together with the one at the side of the housing although, in most cases, the splinters flying off from the sawing region will fly off toward the side and will be intercepted by the strips 24 along the side of the housing 18.

The splinter shield according to the present invention is relatively simple and inexpensive but has proved to be highly effective in respect of eliminating flying splinters from even the heaviest sawing operations.

Modifications may be made within the scope of the appended claims.

What is claimed is:

1. A splinter shield for a saw blade associated with a work supporting table comprising:
   a downwardly opening housing adapted to be mounted above the saw blade and having a front and a side,
   a plurality of flexible strips depending from the front and side of said housing, said strips being substantially wider than they are thick,
   said strips across the front of said housing being arranged in edge to edge relation so that they are substantially coplanar with adjacent strips being in close proximity to one another,
   said strips along the side of said housing being arranged in front to back relation and being spaced by an appreciable distance from one another,
   said strips along the side being substantially parallel to the plane of strips across the front.

2. In combination with a saw blade mounted in a work supporting table, a splinter shield comprising:
   a downwardly opening housing above the saw blade and having a front and a side,
   a plurality of flexible strips depending from the front and side of said housing and having their lower ends immediately adjacent the surface of the table, said strips being substantially wider than they are thick,
   said strips across the front of said housing being arranged in edge to edge relation so that they are substantially coplanar with adjacent strips being in close proximity to one another,
   said strips along the side of said housing being arranged in front to back relation and being spaced by an appreciable distance from one another,
   said strips along the side being substantially parallel to the plane of said strips across the front.

3. A saw guard according to claim 2 which includes clamp means connected to said housing along a lower edge at least at the front and side of the housing, and said strips have their upper ends clamped in said clamp means and are dependent therefrom toward the table to enclose the sawing area without interfering with the movement of workpieces into the sawing area.

4. A saw guard according to claim 1 in which said strips comprise strips of wear resistant flexible material.

5. A saw guard according to claim 1 in which said strips are strips of belt material.

6. A saw guard according to claim 3 in which the clamp means at least at the side of the housing comprises a plurality of like blocks having interfitting tongue and groove regions thereon and a through bolt holding the blocks together, the strips along the side of the housing having their upper ends clamped between adjacent ones of said blocks.

7. A saw guard according to claim 6 in which a spaced pair of said blocks are extended vertically upwardly along the side of the housing and provide means for adjustably supporting the clamp means at the side of the saw blade on the housing.

* * * * *